(12) United States Patent
Laurent et al.

(10) Patent No.: US 11,113,888 B2
(45) Date of Patent: Sep. 7, 2021

(54) DEVICE AND METHOD FOR GENERATING DYNAMIC VIRTUAL CONTENTS IN MIXED REALITY

(71) Applicant: INTERDIGITAL CE PATENT HOLDINGS, SAS, Paris (FR)

(72) Inventors: Anthony Laurent, Vignoc (FR); Matthieu Fradet, Chanteloup (FR); Caroline Baillard, saint sulpice la foret (FR)

(73) Assignee: INTERDIGITAL CE PATENT HOLDINGS, SAS, Paris (FR)

( * ) Notice: Subject to any disclaimer, the term of this patent is extended or adjusted under 35 U.S.C. 154(b) by 0 days.

(21) Appl. No.: 16/474,043

(22) PCT Filed: Dec. 19, 2017

(86) PCT No.: PCT/EP2017/083461
§ 371 (c)(1),
(2) Date: Jun. 26, 2019

(87) PCT Pub. No.: WO2018/122030
PCT Pub. Date: Jul. 5, 2018

(65) Prior Publication Data
US 2019/0340825 A1    Nov. 7, 2019

(30) Foreign Application Priority Data
Dec. 26, 2016    (EP) .................... 16306818.2

(51) Int. Cl.
*G06T 19/00* (2011.01)
*G06T 19/20* (2011.01)

(52) U.S. Cl.
CPC ............ *G06T 19/006* (2013.01); *G06T 19/20* (2013.01); *G06T 2219/2016* (2013.01); *G06T 2219/2021* (2013.01)

(58) Field of Classification Search
CPC .............................. G06T 19/006; G06T 15/10
See application file for complete search history.

(56) References Cited

U.S. PATENT DOCUMENTS 8,939,840 B2 *   1/2015   Heatherly ............... A63F 13/65
                                                              463/42
9,460,340 B2    10/2016   Kauffmann et al.
(Continued)

FOREIGN PATENT DOCUMENTS

CA         2747544 A1    6/2010
CA         2747544 C     6/2016
(Continued)

OTHER PUBLICATIONS

J. Herling and W. Broll, "High-Quality Real-Time Video Inpainting with PixMix," in IEEE Transactions on Visualization and Computer Graphics, vol. 20, No. 6, pp. 866-879, Jun. 2014, doi: 10.1109/TVCG.2014.2298016. (Year: 2014).*
(Continued)

*Primary Examiner* — Phi Hoang
(74) *Attorney, Agent, or Firm* — Invention Mine LLC (57) ABSTRACT

Dynamic virtual content(s) to be superimposed to a representation of a real 3D scene complies with a scenario defined before runtime and involving real-world constraints (23). Real-world information (22) is captured in the real 3D scene and the scenario is executed at runtime (14) in presence of the real-world constraints. When the real-world constraints are not identified (12) from the real-world information, a transformation of the representation of the real 3D scene to a virtually adapted 3D scene is carried out (13) before executing the scenario, so that the virtually adapted 3D scene fulfills those constraints, and the scenario is executed in the virtually adapted 3D scene replacing the real 3D scene instead of the real 3D scene. Application to mixed reality.

15 Claims, 4 Drawing Sheets

(56) References Cited

U.S. PATENT DOCUMENTS

| | | | |
|---|---|---|---|
| 2012/0269494 A1 | 10/2012 | Satyanarayana et al. | |
| 2014/0267409 A1 | 9/2014 | Fein et al. | |
| 2014/0344762 A1 | 11/2014 | Grasset et al. | |
| 2015/0029223 A1* | 1/2015 | Kaino | G09G 3/002 345/633 |
| 2015/0054823 A1* | 2/2015 | Dzhurinskiy | G06T 19/006 345/419 |
| 2015/0077592 A1 | 3/2015 | Fahey | |
| 2015/0187108 A1 | 7/2015 | Mullins | |
| 2016/0314609 A1 | 10/2016 | Taylor et al. | |

FOREIGN PATENT DOCUMENTS

| | | |
|---|---|---|
| CN | 103810353 A | 5/2014 |
| EP | 2996014 A1 | 3/2016 |

OTHER PUBLICATIONS

Xiao J., et al., "Three-dimensional point cloud plane segmentation in both structured and unstructured environments." Robotics and Autonomous Systems 61.12 (2013): 1641-1652.

Herling J., et al.,"High-quality real-time video inpaintingwith PixMix." IEEE Transactions on Visualization and Computer Graphics 20.6 (2014): 866-879.

Shamir, A. "A survey on mesh segmentation techniques." Computer graphics forum. vol. 27. No. 6. Oxford, UK: Blackwell Publishing Ltd, 2008.

Ückermann, A., et al., "Real-time 3D segmentation of cluttered scenes for robot grasping." 2012 12th IEEE-RAS International Conference on Humanoid Robots (Humanoids 2012). IEEE, 2012.

Holz, D. et al. "Real-time plane segmentation using RGB-D cameras." Robot Soccer World Cup. Springer, Berlin, Heidelberg, 2011.

Wang, Z., et al. "Segment and label indoor scene based on RGB-D for the visually impaired." International Conference on Multimedia Modeling. Springer, Cham, 2014.

Valentin, J. et al. "Mesh based semantic modelling for indoor and outdoor scenes." Proc. IEEE Conf. on Computer Vision and Pattern Recognition (CVPR). vol. 6. No. 6.2. 2013.

CN103810353 A, Translated "Real Scene Mapping System and Method in Virtual Reality" May 21, 2014.

* cited by examiner

DEVICE AND METHOD FOR GENERATING DYNAMIC VIRTUAL CONTENTS IN MIXED REALITY

This application claims the benefit, under 35 U.S.C. § 365 of International Application PCT/EP2017/083461, filed Dec. 19, 2017, which was published in accordance with PCT Article 21(2) on Jul. 5, 2018, in English, and which claims the benefit of European Patent Application No. 16306818.2, filed Dec. 26, 2016.

1. TECHNICAL FIELD

The invention relates to the domain of Mixed Reality (MR), in which a computer-generated (CG) content is not just overlaid on the top of a view of the real world, but really interacts with the real-world environment, so that digital and physical realities seamlessly blend together.

2. BACKGROUND ART

Augmented Reality (AR) applications refer to a live view of a real-world environment whose elements are augmented by CG content, such as video or graphics. In MR, the CG content further interacts with the real-world environment.

In AR/MR applications, the visual CG content is inserted in the real-world view at a given position. This position is generally either defined relatively to a predefined visual 2D/3D pattern (for e.g. industrial applications), pre-determined by spatial coordinates (e.g. outdoor location-based applications) or screen coordinates (e.g. Google Glass applications), or manually chosen by a user (e.g. interactive applications).

However, in advanced applications, virtual scenes may contain prepared animated content. This extends from an animation based on a single plane and a reduced occupancy volume (e.g. a character hopping on site or a dancer spinning around) to a complex scenario-built animation based on different planes involving several characters and/or objects with possible interactions and complex trajectories (e.g. a character walks on a plane from an initial position to a second position where he grabs an object, then he changes his direction to go hide the object behind another one, then he changes his direction again and suddenly falls into a hole).

For a good user experience, immersion feeling and realism, such complex virtual animated content should interact spatially with the real environment: the plane the character walks on could be a real planar surface that should be large enough and with enough free place, e.g. a table, the occluding object could be a real one on the table, the hole could correspond to the border of the table, etc.

It is based on this kind of strong assumption and constraints on the geometry of the real environment and presence or absence of real elements that the animated CG content is created by an artist. However, it turns problematic to render efficiently such a complex MR animation if the real environment is not controlled. For example, a horizontal place may be much smaller or much larger than expected, a horizontal plane may have many objects on it so that not enough free place is left to perform the animation without geometric aberrations like missing occlusions. This situation may further lead to questioning the semantic of the animation itself.

A known solution consists in adapting the virtual animation to the real environment. This can be made in two steps: upstream when preparing the virtual animated content, by parameterizing the animation; and in a later preprocessing step, by scanning the real environment and analyzing its layout, so as to compute optimal location, orientation and scale to be applied to the virtual content.

A flexible enhanced solution is developed in this respect in patent application US 2015/0187108 to Daqri LLC, in which augmented reality content is adapted to changes in real world space geometry of a local environment. More precisely, a device can identify a physical change in the real world space geometry based on a mapped real world space geometry, and modify a virtual object in response to that physical change. Such a modification can relate to a size, a shape, a location, or a behavior of the virtual object.

However, such existing solutions do not guarantee that the real environment contains minimal requirements sufficient for rendering efficiently the animation. For example, a horizontal plane may be missing for making a virtual character walk on, or a real object may hide a virtual object grabbed by the character.

Also, dynamically adapting the virtual content as proposed in US 2015/0187108 may be prejudicial to a desired scenario. In addition, providing scenarios flexible enough for being adapted to a large range of real situations can require significant storage and computing resources.

3. SUMMARY

A purpose of the present disclosure is to enable advantageously a flexible adaptation of MR scenarios to a large range of real situations, without requiring significantly additional storage or computing resources.

In preferred embodiments, a number of scenarios with various constraints can thus be executed in real-time on the ground of the real environment.

In this respect, an object of the present disclosure is notably a device for generating at least one dynamic virtual content to be superimposed to a representation of a real 3D scene, the dynamic virtual content(s) complying with at least one scenario defined before a runtime of the scenario(s) and involving at least one real-world constraint. The device comprises:

at least one input adapted to receive real-world information captured in the real 3D scene and
  at least one processor configured for executing the scenario(s) at the runtime in presence of the real-world constraint(s) identified from the real-world information.

According to the present disclosure, the at least one processor is further configured for, when the at least one real-world constraint is not identified from the real-world information, carrying out before executing the scenario(s) a transformation of the representation of the real 3D scene to a virtually adapted 3D scene so that the virtually adapted 3D scene fulfills the constraint(s), and instead of executing the scenario(s) in the real 3D scene, executing the scenario(s) in the virtually adapted 3D scene replacing the real 3D scene.

The device is thereby advantageously configured to act as if the obtained information on the virtually adapted 3D scene were information about the effective real 3D scene, leading to some kind of willful system misleading. Namely, the planned scenarios can advantageously be executed normally, subject to some preliminary virtual patches applied to the representation of the real world.

It can be noted that MR scenarios may have been designed upstream without any precise knowledge of the environment, or for a large variety of different environments—e.g. for a TV set and a table on which the TV is positioned, without more precision. The adaptation is then advantageously effected locally at the run place, so as to make those scenarios operational.

In what follows, it will be made reference to "adapted" or "completed" environment or real scene, or to "moved" or "transformed" real objects. Those expressions, used for sake of convenience and conciseness, should be understood as meaning that the real 3D scene is subject to a related transformation of its representation before executing a scenario, through virtual effects. Those virtual effects can include notably additions, subtractions, color or texture modifications. More generally, they comprise any changes to a perception of the real 3D scene by a user due to actions on the representation of the reality.

Such a representation is further meaning any kind of representation to a user, which may in particular be through transparent or translucent glasses (direct view), or by the intermediary of a camera capturing images of the real 3D scene, those images being visualized by a user on a screen (indirect view). Those techniques will not be developed here, as well known to persons having ordinary skills in the art.

A scenario is defined as a CG content animation predesigned by a creator.

The representation of the real 3D scene, as well as of the virtually adapted 3D scene, is preferably carried out in real time.

Contrary to the existing solutions, and surprisingly for a skilled person used to adaptations of the virtual world to the real world, the present device artificially introduces virtual modifications as if applied to the real world for satisfying virtual scenario constraints. Though the applied transformations actually remain in the field of the virtual world, they are introduced before a given scenario is executed, so as to meet constraints normally related to the real world.

In an embodiment, the transformation of the representation of the real 3D scene is carried out at a preliminary adjustment stage, before any scenario runtime.

In another embodiment, the transformation of that representation is carried out during the runtime of a former scenario, and anticipates one or more following scenario. In this respect, different successive parts of a given scenario comprising two or more scenes may possibly be considered as distinct scenarios, insofar as each of those successive parts is associated with at least one respective real-world constraint.

In an enhanced version, the passage of one part of a scenario to another part is triggered by a change in the real 3D scene (e.g. a real object is removed in the environment). This includes advantageously even the case where the scenario comprises similar features and real-world constraints in both parts, but where at least one of the constraints relies on specificities of the real 3D scene that are modified during the runtime. Then, that change can be taken into account by meeting the concerned constraint(s) in the virtually adapted 3D scene through tricking the perception of the real 3D scene in the frame of the MR processing, as disclosed previously. The part of the scenario following the change is then itself considered as a "scenario".

The real-world information captured in the real 3D scene comprises advantageously a point cloud or 3D model, obtained from scanning the environment. Also, the at least one processor is advantageously configured for determining environment specificities, such as notably identifying objects present in the real 3D scene together with part or all of their type, position, size and shape, as well as free planar areas. It is also advantageously configured for analyzing MR application requirements (the real-world constraints, which can concern notably elements or free planar areas) and checking if the environment fulfills those requirements, even partially.

Also, the at least one processor is advantageously configured for updating an MR application to be executed or currently being executed, with the virtually adapted 3D scene replacing the real 3D scene.

In a preferred implementation, the at least one real-world constraint are at least two and are potentially interacting, and the at least one processor is further configured for carrying out the transformation jointly for those real-world constraints so that the virtually adapted 3D scene fulfills those constraints.

In some related embodiments, the joint transformation is then iteratively effected, through several successive attempts directed to different items of transformation until the two or more constraints are met.

In another implementation, the at least one real-world constraint are at least two, are potentially interacting and are ranked according to an importance order. The at least one processor is further configured for carrying out the transformation in priority for the constraint(s) having at least one highest priority rank and for executing the scenario at the runtime in the absence of at least one of the real-world constraints distinct from the real-world constraints having the highest priority rank(s).

Consequently, some constraints can be met while others are not, insofar as the latter are deemed less critical in the execution of the concerned scenario.

According to preferred embodiments, considered alone or in any suitable combination:
  the at least one constraint includes a presence of at least one real-world object, and the at least one processor is configured for adding a virtual representation of the real-world object(s) in the virtually adapted 3D scene;
  the at least one constraint relates to at least one dimension of at least one real-world object, and the at least one processor is configured for modifying a representation of the at least one dimension of the real-world object(s) in the virtually adapted 3D scene so that the at least one constraint on the dimension(s) is met;
  the at least one processor is configured for transforming in the virtually adapted 3D scene a virtual representation of at least one real-world object prejudicial to the at least one constraint, so that the at least one constraint is met;
  the at least one processor is configured for carrying out the transformation by at least one of removing, reducing and moving the real-world object(s) in the virtually adapted 3D scene;
  the at least one constraint concerns at least one real-world object and the at least one processor is configured for carrying out the transformation by at least one of moving, rotating, translating, scaling, duplicating the real-world object(s) so that the at least one constraint on the real-world object(s) is met.

Advantageously, the transformation involving clearing up at least one area in the virtually adapted 3D scene, the at least one processor is further configured for inpainting the at least one area in the virtually adapted 3D scene.

A perception of continuity can then be provided to a user even in case some irregularities are introduced by the virtual adaptations, e.g. by virtually removing a real object of the real 3D scene.

In some implementations, the at least one processor is further configured for letting a user participate expressly in carrying out the transformation.

The user can thereby complete automatic processes, which makes notably possible more user-friendly or customized scenario executions.

Advantageously, the at least one input is also adapted to receive the scenario(s) and the device further comprises at least one output adapted to output at least part of a representation of the virtually adapted 3D scene for a user to visualize the scenario(s) in the virtually adapted 3D scene.

The disclosure further pertains to an apparatus comprising a device according to the disclosure, that apparatus being a video receiver, a mobile phone, a tablet or an augmented reality head-mounted display system.

Another object of the present disclosure is a device for generating at least one dynamic virtual content to be superimposed to a representation of a real 3D scene, the dynamic virtual content(s) complying with at least one scenario defined before a runtime of the scenario(s) and involving at least one real-world constraint. The device comprises:
- means for receiving real-world information captured in the real 3D scene and
- means for executing the scenario(s) at the runtime in presence of the real-world constraint(s) identified from the real-world information.

According to the present disclosure, the means for executing are adapted for, when the at least one real-world constraint is not identified from the real-world information, carrying out before executing the scenario(s) a transformation of the representation of the real 3D scene to a virtually adapted 3D scene so that the virtually adapted 3D scene fulfills the constraint(s), and instead of executing the scenario(s) in the real 3D scene, executing the scenario(s) in the virtually adapted 3D scene replacing the real 3D scene.

The disclosure also concerns a method for generating at least one dynamic virtual content to be superimposed to a representation of a real 3D scene, the at least one dynamic virtual content complying with at least one scenario defined before a runtime of the scenario(s) and involving at least one real-world constraint. That method comprises:
- receiving real-world information captured in the real 3D scene and
- executing the scenario(s) at the runtime in presence of the real-world constraint(s) identified from the real-world information.

According to the disclosure, the method further comprises, when the at least one real-world constraint is not identified from the real-world information, carrying out before executing the scenario(s) a transformation of the representation of the real 3D scene to a virtually adapted 3D scene so that the virtually adapted 3D scene fulfills the at least one constraint, and instead of executing the scenario(s) in the real 3D scene, executing the scenario(s) in the virtually adapted 3D scene replacing the real 3D scene.

That method is advantageously executed by a device according to any of the implementation modes of the disclosure.

In addition, the disclosure relates to a computer program for generating at least one dynamic virtual content, comprising software code adapted to perform a method compliant with any of the above execution modes when the program is executed by a processor.

The present disclosure further pertains to a non-transitory program storage device, readable by a computer, tangibly embodying a program of instructions executable by the computer to perform a method for generating at least one dynamic virtual content compliant with the present disclosure.

Such a non-transitory program storage device can be, without limitation, an electronic, magnetic, optical, electromagnetic, infrared, or semiconductor device, or any suitable combination of the foregoing. It is to be appreciated that the following, while providing more specific examples, is merely an illustrative and not exhaustive listing as readily appreciated by one of ordinary skill in the art: a portable computer diskette, a hard disk, a ROM (read-only memory), an EPROM (Erasable Programmable ROM) or a Flash memory, a portable CD-ROM (Compact-Disc ROM).

4. LIST OF FIGURES

The present disclosure will be better understood, and other specific features and advantages will emerge upon reading the following description of particular and non-restrictive illustrative embodiments, the description making reference to the annexed drawings wherein.

5. DETAILED DESCRIPTION OF EMBODIMENTS

The present description illustrates the principles of the present disclosure. It will thus be appreciated that those skilled in the art will be able to devise various arrangements that, although not explicitly described or shown herein, embody the principles of the disclosure and are included within its spirit and scope.

All examples and conditional language recited herein are intended for educational purposes to aid the reader in understanding the principles of the disclosure and the concepts contributed by the inventor to furthering the art, and are to be construed as being without limitation to such specifically recited examples and conditions.

Moreover, all statements herein reciting principles, aspects, and embodiments of the disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that the block diagrams presented herein represent conceptual views of illustrative circuitry embodying the principles of the disclosure. Similarly, it will be appreciated that any flow charts, flow diagrams, and the like represent various processes which may be substantially represented in computer readable media and so executed by a computer or processor, whether or not such computer or processor is explicitly shown.

The terms "adapted" and "configured" are used in the present disclosure as broadly encompassing initial configuration, later adaptation or complementation of the present device, or any combination thereof alike, whether effected through material or software means (including firmware).

The functions of the various elements shown in the figures may be provided through the use of dedicated hardware as well as hardware capable of executing software in association with appropriate software. When provided by a processor, the functions may be provided by a single dedicated processor, a single shared processor, or a plurality of individual processors, some of which may be shared. Moreover, explicit use of the term "processor" should not be construed to refer exclusively to hardware capable of executing software, and refers in a general way to a processing device, which can for example include a computer, a microprocessor, an integrated circuit, or a programmable logic device (PLD). Additionally, the instructions and/or data enabling to perform associated and/or resulting functionalities may be stored on any processor-readable medium such as, e.g., an integrated circuit, a hard disk, a CD (Compact Disc), an optical disc such as a DVD (Digital Versatile Disc), a RAM (Random-Access Memory) or a ROM memory. Instructions may be notably stored in hardware, software, firmware or in any combination thereof.

It should be understood that the elements shown in the figures may be implemented in various forms of hardware, software or combinations thereof. Preferably, these elements are implemented in a combination of hardware and software on one or more appropriately programmed general-purpose devices, which may include a processor, memory and input/output interfaces.

Figure 1:
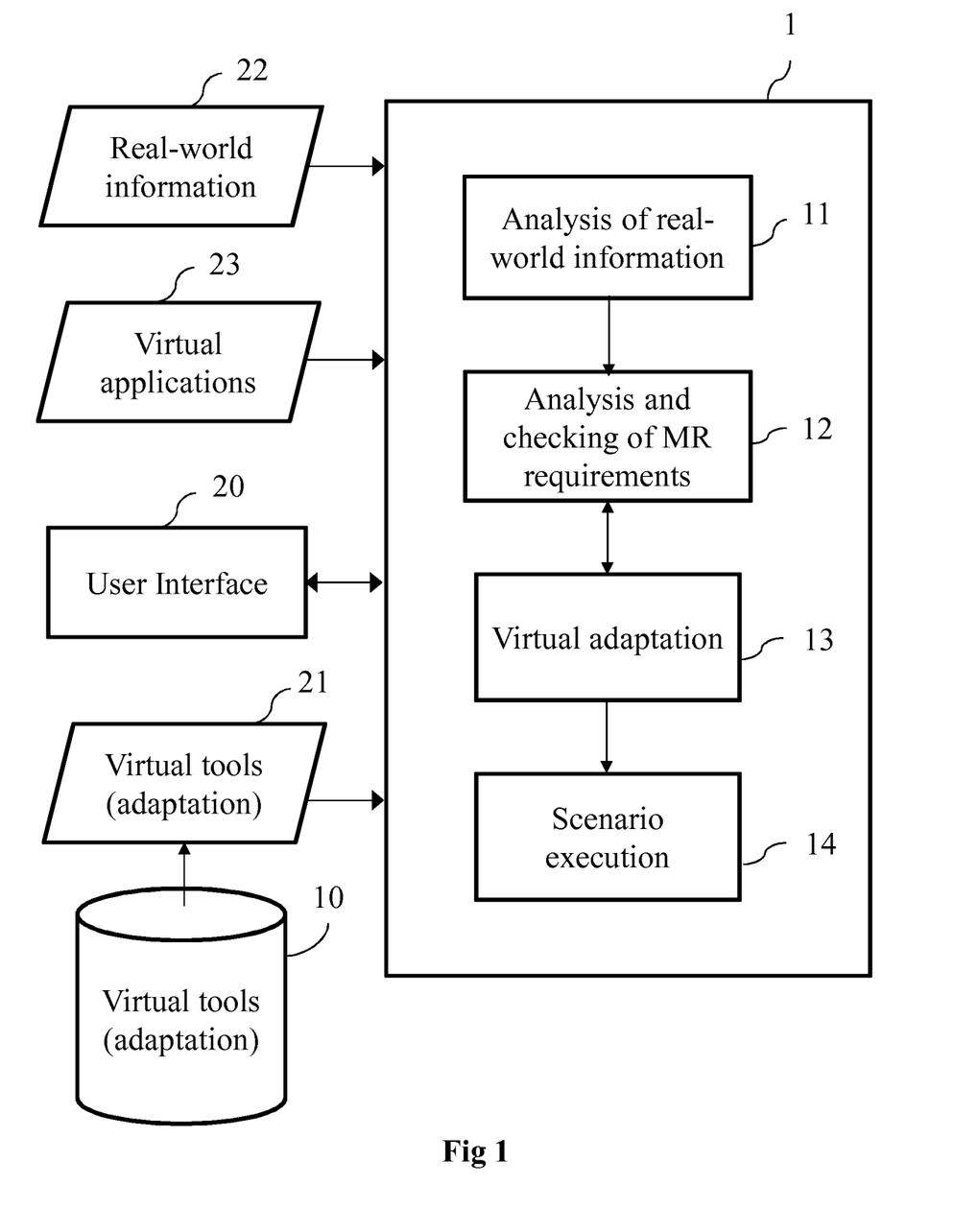
FIG. 1 is a block diagram representing schematically a device for generating dynamic virtual contents, compliant with the present disclosure.

The present disclosure will be described in reference to a particular functional embodiment of device 1 for generating dynamic virtual contents, as illustrated on FIG. 1.

The device 1 is adapted to generate at least one dynamic virtual content to be superimposed to a representation of a real 3D scene and complying with at least one scenario, and is relevant to mixed reality (MR).

The device 1 is advantageously an apparatus, or a physical part of an apparatus, designed, configured and/or adapted for performing the mentioned functions and produce the mentioned effects or results. In alternative implementations, the device 1 is embodied as a set of apparatus or physical parts of apparatus, whether grouped in a same machine or in different, possibly remote, machines.

In what follows, the modules are to be understood as functional entities rather than material, physically distinct, components. They can consequently be embodied either as grouped together in a same tangible and concrete component, or distributed into several such components. Also, each of those modules is possibly itself shared between at least two physical components. In addition, the modules are implemented in hardware, software, firmware, or any mixed form thereof as well. They are preferably embodied within at least one processor of the device 1.

The device 1 comprises a module 11 for analyzing real-world information 22 retrieved e.g. from a camera capture of a real 3D scene, a module 12 for analyzing and checking requirements of an MR scenario (virtual application 23) with respect to the analyzed real-world information 22, a module 13 for proceeding with a related virtual adaptation applied to a representation of the real 3D scene, and a module 14 for executing the scenario as applied to a virtually adapted 3D scene resulting from that adaptation. The output of the module 13 can possibly return to the module 12, so that adaptations can be iteratively adjusted until a satisfying adaptation solution is found.

Information can be entered and retrieved by a user via a user interface 20 interacting with the device 1. The user interface 20 includes any means appropriate for entering or retrieving data, information or instructions, notably visual, tactile and/or audio capacities that can encompass any or several of the following means as well known by a person skilled in the art: a screen, a keyboard, a trackball, a touchpad, a touchscreen, a loudspeaker, a voice recognition system.

The device 1 is also adapted to be provided with virtual tools 21 from storage resources 10, dedicated to carrying out the virtual adaptation to the MR scenario requirements. Those storage resources 10 can be available from any kind of appropriate storage means, which can be notably a RAM or an EEPROM (Electrically-Erasable Programmable Read-Only Memory) such as a Flash memory, possibly within an SSD (Solid-State Disk).

A functioning of the device 1 is detailed below.

5.1 Pre-Requisite: Scenario Definition

In an initial step, an MR application creator defines a scenario. He specifies notably real elements involved in the scenario and how virtual elements interact with them. Examples of successive scenario elements are as follows:
- a first virtual stone falls, bounces on a real cube and stops on a real table;
- a second virtual stone impacts a real empty glass;
- a virtual animal has a pre-defined and non-modifiable animation that is located in a free planar area on the real table;
- a virtual character walks on the ground in a free area, climbs a real table foot, walks on the real table and joins a virtual animal; its trajectory depends on free areas on the real table.

To fulfill this scenario, the creator specifies some requirements about the real environment. Some examples of requirements for the previous scenario are listed below, the scene taking place indoor:
- a table with a minimal size of 1.20 m×0.60 m;
- a free planar area on the table, having dimensions of 0.3 m×0.2 m and centered on a table center;
- a cube having a side of 0.10 m, lying on a left part of the table;
- an empty glass lying on the table;
- a free planar area on the ground, having dimensions of 0.6 m×0.3 m, located on the left of the table and including a front left foot of the table.

Requirements can also impose a specific position or orientation. They can further be affected by a "constraint level". Namely, some requirements are strongly constraining whilst others are less. For example, a strongly constraining requirement consists in having a table with a size of 1.20 m×0.60 m, because if the table exists, it must have these exact dimensions to fulfill the requirement. A less constraining requirement consists in having a cube with a side of 0.10 m lying on the left of the table, because its precise location is not imposed.

5.2 Pre-Requisite: Hierarchical Sorting of the Requirements

The requirements are preferably sorted in a hierarchical way related to links between the requirements. Each requirement is thus allotted a hierarchical level, the hierarchical classification being done by the content creator within a content authoring stage.

Considering e.g. the requirements above, the most important requirement is the first one ("a table with a minimal size of 1.20 m×0.60 m"). The four other ones depend on the presence of the table, but are independent from each other. Therefore, they have the same importance, i.e. the same hierarchy level. The following sorted table is thus obtained:

1 A table with a minimal size of 1.20 m×0.60 m
1.1 A free planar area on the table, having dimensions of 0.3 m×0.2 m and centered on a table center
1.2 A cube having a side of 0.10 m, lying on a left part of the table
1.3 An empty glass lying on the table
1.4 A free planar area on the ground, having dimensions of 0.6 m×0.3 m, located on the left of the table and including a front left foot of the table If an additional requirement such as "A cylinder with a radius of 0.1 m and a height of 0.3 m lying on the cube" is included, then its level is 1.2.1, as it depends on the fulfillment of the requirement 1.2.

5.3 Environment Scan and Specificities Determination

A next step consists in an environment scan and the determination of related specificities. It is directed to establishing an environment description by detecting and labeling the environment specificities such as notably the objects present in the environment (e.g. a table, a glass lying on the table, a plant) and the free planar areas.

Accordingly, the user scans his environment, which can be achieved notably with a device equipped with a depth sensor such as a product commercialized under the name "Intel Real Sense", which provides a point cloud of the scanned scene.

The point cloud is then analyzed to detect and label the environment characteristics. Technical solutions for achieving that task are described in particular in the articles "Real-Time Plane Segmentation using RGB-D Cameras", by Dirk Holz, Stefan Holzer, Rady Bogdan Rusu and Sven Behnke in *Proceedings of the 15th RoboCup International Symposium*, Istanbul, July 2011; "Real-time 3D segmentation of cluttered scenes for robot grasping", by André Uckermann, Robert Haschke and Helge J. Ritter in *Humanoids* 2012, pp. 198-203; "Segment and Label Indoor Scene Based on RB-D for the Visually Impaired", by Zhe Whang, Hong Liu, Xiangdong Wang and Yueliang Qian in *Multi-Media Modeling* 2014, pp. 449-460; and "Three-dimensional point cloud plane segmentation in both structured and unstructured environments", by J. Xiao, J. Zhang, B. Adler, H. Zhang and J. Zhang in *Robotics and Autonomous Systems* 2013, 61(12), pp. 1641-1652.

The analysis of the environment can also be achieved with a device such as commercialized under the name Microsoft Hololens, which outputs a 3D mesh. Some solutions enabling to retrieve environment characteristics from such a 3D mesh include those described in the articles "Mesh Based Semantic Modelling for Indoor and Outdoor Scenes", by Julien P. C. Valentin, Sunando Sengupta, Jonathan Warrel, Ali Shahrokni and Philip H. S. Torr in *CVPR* 2013; and "A survey on Mesh Segmentation Techniques", by Ariel Shamir in *Computer Graphics forum*, vol. 27, 2008, n. 6, pp. 1539-1556.

The module 11 for analyzing real-world information, in charge of this step, can either be embedded in the device used to scan the scene or run on a server.

5.4 Virtual Information Determination

At the present level, the description of the environment is known. The present step consists in analyzing the various environment descriptions combined with the scenario requirements to determine the virtual environment that is possibly required. This virtual environment is unique for each user and is superimposed to the real environment, so as to offer to all users similar behavior and experience.

That step comprises two parts: checking the scenario requirements that are fulfilled and the ones that are not (module 12) and determining, for each real environment, how to compensate each scenario requirement not fully fulfilled (module 13).

Those two parts are detailed below in relation with the example requirements presented previously. Accordingly, the environment must contain:
  1/ a table with a minimal size of 1.20 m×0.60 m;
  2/ a free planar area on the table, having dimensions of 0.3 m×0.2 m and centered on a table center;
  3/ a cube having a side of 0.10 m, lying on a left part of the table;
  4/ an empty glass lying on the table;
  5/ a free planar area on the ground, having dimensions of 0.6 m×0.3 m, located on the left of the table and including a front left foot of the table.

Figure 2:
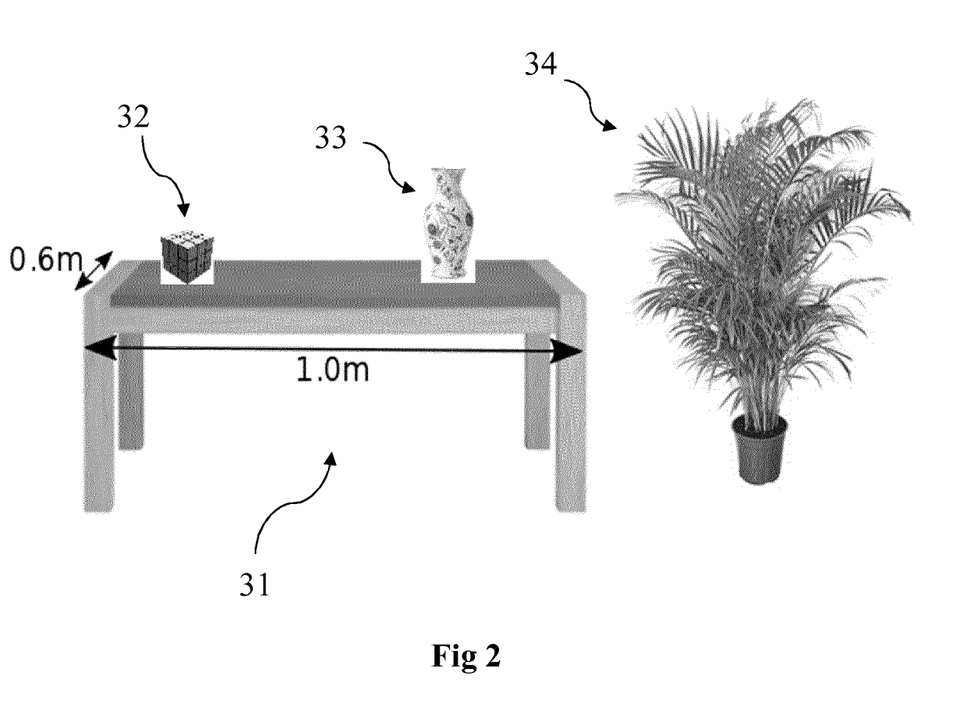
FIG. 2 illustrates an example of a user's environment considered for exploiting the device of FIG. 1.

An illustrative real environment is represented on FIG. 2, on which a table 31 has a cube 32 lying on a left side and a vase 33 lying on the right side, while a plant 34 is positioned on the right of the table 31.

5.4.1 Checking of Scenario Requirements

The module 12 checks which scenario requirements are fulfilled and which are not, the total number of requirements being noted nbReq.

A corresponding algorithm proceeds in:
  loading the characteristics deduced from environment scan and specificities determination (module 11);
  creating a list statusList of nbReq Booleans storing the status of each requirement (fully fulfilled or not);
  creating a list dataList of nbReq data storing either the real environment specificity/specificities if the corresponding scenario requirement is fulfilled partially or fully, or nothing in the other case;
  loading the list of scenario requirements.
For each scenario requirement, the module 13 is then in charge of:
  checking if the requirement is fulfilled or not;
  if yes, setting the corresponding element of statusList to True, and filling the corresponding element of dataList with the environment specificity/specificities associated with this requirement;
  if no, setting the corresponding element of statusList to False, and filling the corresponding element of dataList with the environment specificity/specificities associated with this requirement (e.g. an object exists but is smaller than expected or at a wrong position) or to Empty if there is no specificities (e.g. the required object does not exist).

It should be noted that even if the requirement is only partly fulfilled, it is interesting to store the environment specificity/specificities, for reasons developed below.

Following the example above, the statusList has the following values:
  1/ False (the table 31 has not the required dimensions)
  2/ True
  3/ True (cube 32)
  4/ False
  5/ True
and the dataList has the following values:
  1/ Table size is 1.0 m×0.6 m
  2/ Free planar area of size 0.5 m×0.6 m centered at ($X_{tfp}$, $Y_{tfp}$)
  3/ The cube 32 with a size of 0.10 m centered at ($X_c$, $Y_c$)
  4/
  5/ A free planar area on the ground of 2 m×1 m centered at ($X_{gfp}$, $Y_{gfp}$)

5.4.2 Analysis of Scenario Requirements

Further to the analysis of the MR application requirements (in particular: elements, free planar areas) and to the checking of whether the environment fulfills these requirements, even if partially, the module 13 completes the existing parts of the user (real) environment not fully fulfilling the requirement(s), with virtual elements. This adaptation is such that any environment eventually contains common specificities ensuring the MR application to be rendered in a similar way.

Finally, the module 13 updates the MR application with the virtual environment enhancing the real one.

More precisely, the module 13 determines for each specific real environment, how to compensate each scenario requirement not fully fulfilled.

In a first situation, specificities are missing, which may amount to the absence of a required element—such as e.g. a glass in the example above. This issue is solved by adding a virtual object, which is based on a predefined virtual model of the object.

In a second situation, specificities are present in the real environment, but not in the appropriate way. This covers notably the case where a required object is present but its size, position and/or orientation does not fulfill the scenario requirement. As the real object is labeled, its related 3D model and possibly its texture are known. Then, in advantageous implementations, that 3D model is transformed (moved, scaled and/or rotated).

If the 3D model is too small, it can be up-scaled, and if it is too large, it can be down-scaled. In the latter case, the part of the real object "removed" or "missing" in the real environment is filled, which can be done by inpainting techniques such as developed for example in the article "High-Quality Real-Time Video Inpainting with PixMix", by Jan Herling and Wolfgang Broll in *IEEE Transactions on Visualization and Computer Graphics*, Vol. 20, 2014, n. 6, pp. 866-879.

If the required object is present in the real 3D scene but at the wrong position, it is advantageously either moved or duplicated/cloned. Then, if the applied solution consists in moving the object, the region of the real object that is no longer covered by the object is filled (which can be done by inpainting). Similar actions can be done if the object orientation is not correct.

In another embodiment, the user is asked to manually move and/or rotate the real object at the right position and/or orientation. In this respect, the final location and/or orientation of the object is shown to the user by displaying a virtual object, the geometry of which is the same as the one of the real object. The user moves/rotates the representation of the real object until it is superimposed with the virtual object.

In case of missing or not large enough free planar area/volume, the two previously stated methods can be applied. It is made possible to "remove" the representation of real elements occupying the planar area/volume with using inpainting techniques, and the user can be asked to manually "clean" the area/volume.

5.4.3 Joint Management of Multiple Scenario Requirements

Compensating a requirement not fully fulfilled may lead to the fact that another requirement is no longer fulfilled. For instance, by adding a missing glass on the table 31 (FIG. 2), the free area of the requirement 2 (a free planar area on the table of 0.3 m×0.2 m) may disappear.

An algorithm exploited for managing such situations is described below. For each current element of the statusList having its value set to False, the current element having then an index called Ifalse, the following steps are executed:
- determine a solution to fulfill the requirement corresponding to that current element, as developed above;
- set the current element of statusList with the index Ifalse to True;
- for each other element of the statusList having its value set to True (and having an index called Itrue), check whether the corresponding requirement is still fulfilled when adopting the solution above for the current element;
- if not, testing another configuration allowing to have the requirement of index Itrue still fulfilled for the current element;
- if not possible, let the current element of statusList, with the index Ifalse, to False.

An enhanced version of that process enables to avoid having in an uncontrolled way only the first processed requirements met, while later considered ones cannot be fulfilled ("first arrived, first served"). Accordingly, the requirements having highest ranking priorities are processed first, and the other requirements are processed according to a successively decreasing ranking, down to the lowest one.

In a further improved version, it is checked whether some modifications can be applied to the representation of one or more real elements that already fulfill the requirement(s) for which the statusList value is True (including notably elements having already been arranged), so as to obtain that:
- the already fulfilled requirements remain fully fulfilled;
- the current requirement with the index Ifalse is also fully fulfilled.

In other words, this step tries to find a combination of modifications satisfying both objectives, while modifying the representation of a real element may induce modifying the representation of one or more (possibly many) others.

Again, the hierarchy of the requirements is advantageously exploited for privileging highest ranks when all constraints cannot be met.

In case all elements of statusList are equal to True, a solution is found that fully fulfills the scenario. Otherwise, no trivial solution is found and one or more constraints having a lowest priority ranking (or lowest priority rankings) can be left aside. In a variant implementation in the absence of any global solution, all requirements are presented to the user, who is requested to modify the representation of his real environment (adding/moving/removing elements) in order to satisfy the requirements.

Figure 3:
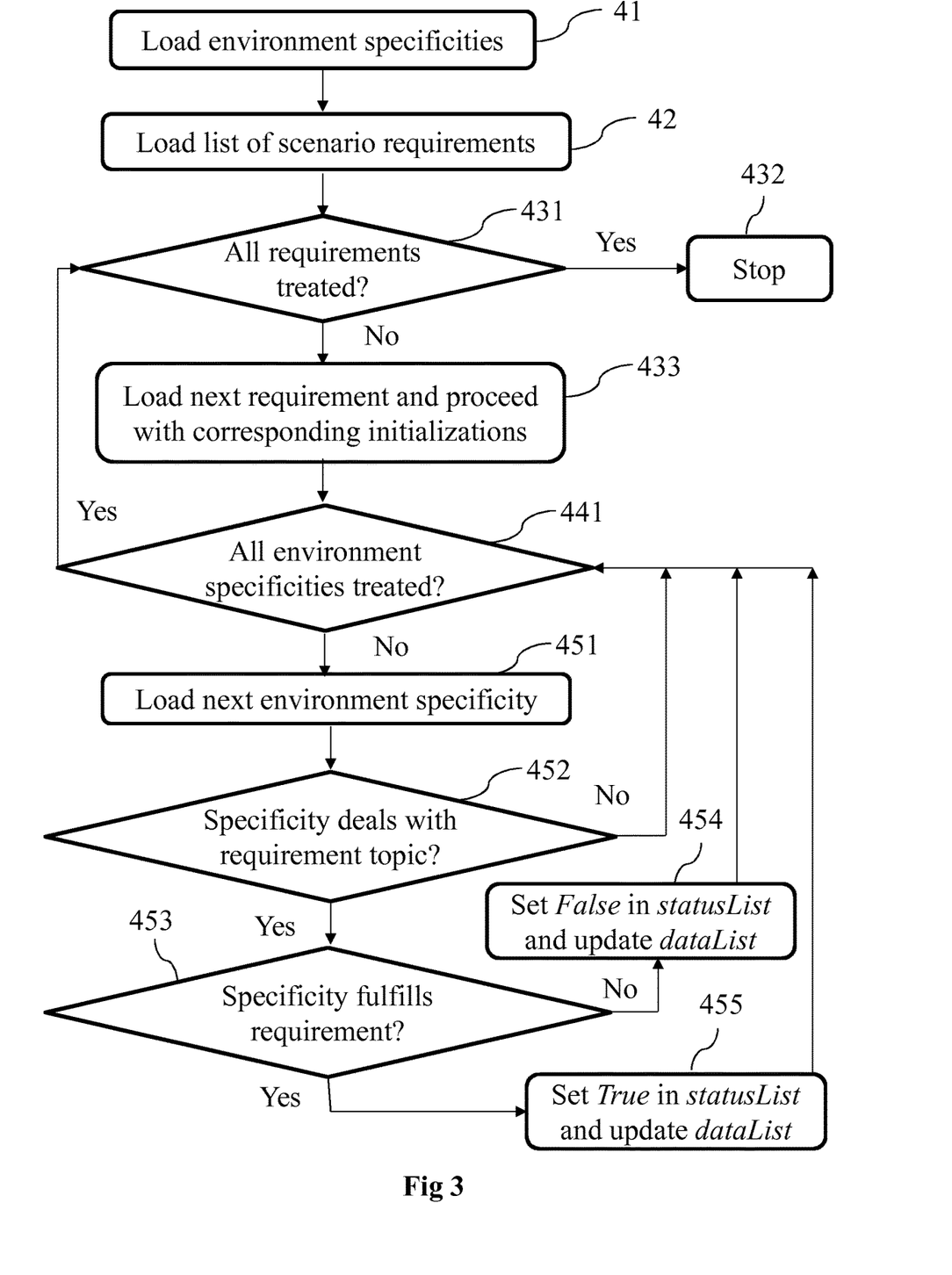
FIG. 3 is a flow chart showing successive mixed reality steps executed with the device of FIG. 1.

In execution, as illustrated on FIG. 3, the device 1 proceeds preferably as follows in an MR operation. In acquisition stages, specificities of the real 3D environment (those specificities being associated with respective, possibly identical, topics) are loaded (step 41) as well as a list of scenario requirements (step 42). It is checked whether all the requirements have been treated (step 431). If yes, the process is stopped (step 432). Otherwise, a next requirement is loaded, the corresponding statusList being initialized at False and the corresponding dataList to Empty (step 433).

It is then checked whether all environment specificities have been treated (step 441). If yes, the process loops back to step 431. Otherwise, a next environment specificity is loaded (step 451). It is then checked whether the specificity deals with the requirement topic (step 452). If no, the process looks back to step 441. Otherwise, it is checked whether the specificity fulfills the considered requirement (step 453). If no, the corresponding statusList is set to False, the specificity is added into the corresponding dataList, and the process loops back to step 441.

Otherwise, the corresponding statusList is set to True, the specificity is added into the corresponding dataList, and the process loops back to step 441.

Figure 4:
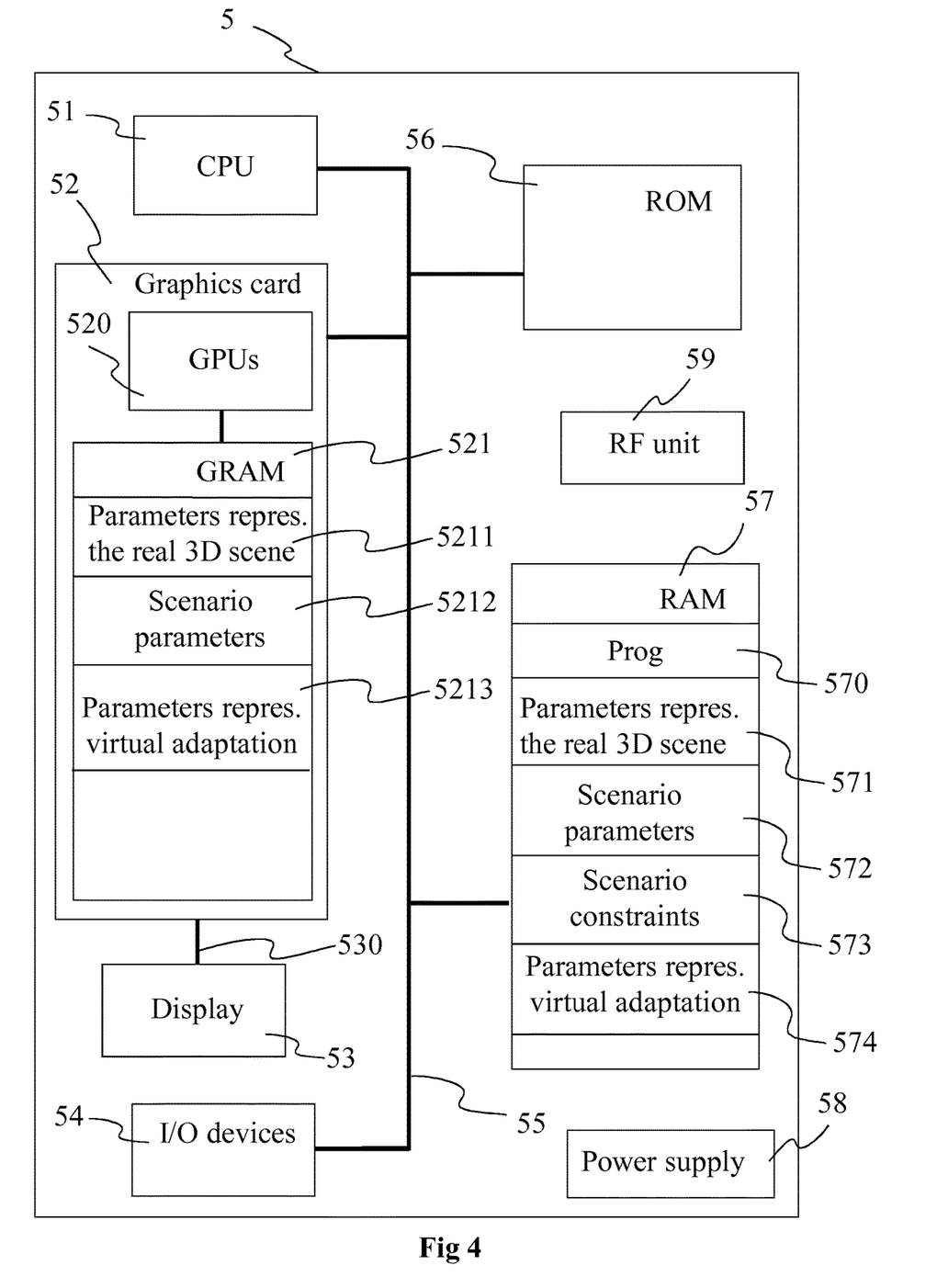
FIG. 4 diagrammatically shows a MR apparatus comprising the device represented on FIG. 1.

A particular apparatus 5, visible on FIG. 4, is embodying the device 1 described above. It corresponds for example to a tablet, a smartphone, a head-mounted display (HMD), a games console—such as a specialized games console producing and displaying images live, or a laptop. That apparatus 5 is suited to augmented reality, whether for direct view (the user is typically viewing the real 3D scene through a glass) or for indirect view (the user is viewing the real 3D scene displayed on a screen). Both capacities can also be combined.

The apparatus 5 comprises the following elements, connected to each other by a bus 55 of addresses and data that also transports a clock signal:
- a microprocessor 51 (or CPU);
- a graphics card 52 comprising several Graphical Processor Units (or GPUs) 520 and a Graphical Random Access Memory (GRAM) 521;
- a non-volatile memory of ROM type 56;
- a RAM 57;
- one or several I/O (Input/Output) devices 54 such as for example a keyboard, a mouse, a joystick, a webcam; other modes for introduction of commands such as for example vocal recognition are also possible;
- a power source 58; and
- a radiofrequency unit 59.

The apparatus 5 also comprises a display device 53 of display screen type directly connected to the graphics card 52 to display synthesized images calculated and composed in the graphics card, for example live. The use of a dedicated bus to connect the display device 53 to the graphics card 52 offers the advantage of having much greater data transmission bitrates and thus reducing the latency time for the displaying of images composed by the graphics card. According to a variant, a display device is external to apparatus 5 and is connected thereto by a cable or wirelessly for transmitting the display signals. The apparatus 5, for example through the graphics card 52, comprises an interface for transmission or connection adapted to transmit a display signal to an external display means such as for example an LCD or plasma screen or a video-projector. In this respect, the RF unit 59 can be used for wireless transmissions.

In an alternative implementation, the display device 53 corresponds to a glass through which the user is seeing the real environment, and the apparatus 5 further comprises an optical projection system (not represented), which enables to project e.g. generated virtual images or contents on the glass.

It is noted that the word "register" used in the description of memories 521, 56, and 57 designates in each of the memories mentioned, both a memory zone of low capacity (some binary data) as well as a memory zone of large capacity (enabling a whole program to be stored or all or part of the data representative of data calculated or to be displayed). Also, the registers represented for GRAM 521 can be arranged and constituted in any manner, and each of them does not necessarily correspond to adjacent memory locations and can be distributed otherwise (which covers notably the situation in which one register includes several smaller registers).

When switched-on, the microprocessor 51 loads and executes the instructions of the program contained in the RAM 57.

The random access memory 57 comprises notably:
- in a register 570, the operating program of the microprocessor 51 responsible for switching on the apparatus 5,
- in a register 571, parameters representative of the real 3D scene (for example models of the object(s) of the scene and lighting parameters);
- in a register 572, parameters representative of one or several MR scenarios;
- in a register 573, constraints on the real 3D scene, associated with the MR scenarios;
- in a register 574, parameters on virtual adaptations with respect to the real 3D scene and corresponding to the constraints of the MR scenarios.

The algorithms implementing the steps of the method specific to the present disclosure and described above are stored in the memory GRAM 521 of the graphics card 52 associated with the apparatus 5 implementing those steps. When switched on and once the parameters 571, 572 and 574 are loaded into the RAM 57, the graphic processors 520 of graphics card 52 load those parameters into the GRAM 521 and execute the instructions of those algorithms in the form of microprograms of "shader" type using HLSL (High Level Shader Language) language or GLSL (OpenGL Shading Language) for example.

The random access memory GRAM 521 comprises notably:
- in a register 5211, the parameters representative of the real 3D scene;
- in a register 5212, the parameters representative of the MR scenarios;
- in a register 5213, the parameters representative of the virtual adaptations to be applied in relation with the scenario constraints.

According to a variant, at least some of the data pertaining to primitives are stored in the RAM 57 and processed by the microprocessor 51. This variant however causes greater latency time in the composition of an image comprising a representation of the environment composed from microprograms contained in the GPUs 520 as the data must be transmitted from the graphics card to the random access memory 57 passing by the bus 55, for which the transmission capacities are generally inferior to those available in the graphics card for transmission of data from the GPUs 520 to the GRAM 521 and vice-versa.

As will be understood by a skilled person, the presence of the graphics card 52 is not mandatory, and can be replaced with simpler visualization implementations.

According to another variant, the power supply 58 is external to the apparatus 1.

On the ground of the present disclosure and of the detailed embodiments, other implementations are possible and within the reach of a person skilled in the art without departing from the scope of the invention. Specified elements can notably be interchanged or associated in any manner remaining within the frame of the present disclosure. Also, elements of different implementations may be combined, supplemented, modified, or removed to produce other implementations. All those possibilities are contemplated by the present disclosure.

The invention claimed is:

1. A device configured to generate at least one dynamic virtual content to be superimposed to a representation of a real 3D scene, said at least one dynamic virtual content complying with at least one scenario defined before a runtime of said at least one scenario and involving at least one real-world constraint, said device comprising:

at least one input adapted to receive real-world information captured in said real 3D scene; and at least one processor configured to execute said at least one scenario at said runtime in presence of said at least one real-world constraint identified from said real-world information, wherein said at least one processor is further configured, when said at least one real-world constraint is not identified from said real-world information, to carry out before executing said at least one scenario a transformation of said representation of said real 3D scene to a virtually adapted 3D scene so that said virtually adapted 3D scene fulfills said at least one constraint, and instead of executing said at least one scenario in said real 3D scene, executing said at least one scenario in said virtually adapted 3D scene replacing said real 3D scene.

2. The device according to claim 1, wherein said at least one real-world constraint are at least two and are potentially interacting, and said at least one processor is further configured to carry out said transformation jointly for said at least two real-world constraints so that said virtually adapted 3D scene fulfills said at least two constraints.

3. The device according to claim 1, wherein said at least one real-world constraint are at least two, are potentially interacting and are ranked according to an importance order, and said at least one processor is further configured to carry out said transformation in priority for said at least one real-world constraint having at least one highest priority rank and to execute said at least one scenario at said runtime in the absence of at least one of said at least one real-world constraint distinct from said at least one real-world constraint having said at least one highest priority rank.

4. The device according to claim 1, wherein said at least one constraint includes a presence of at least one real-world object, and said at least one processor is configured to add a virtual representation of said at least one real-world object in said virtually adapted 3D scene.

5. The device according to claim 1, wherein said at least one constraint relates to at least one dimension of at least one real-world object, and said at least one processor is configured to modify a representation of said at least one dimension of said at least one real-world object in said virtually adapted 3D scene so that said at least one constraint on said at least one dimension is met.

6. The device according to claim 1, wherein said at least one processor is configured to transform in said virtually adapted 3D scene a virtual representation of at least one real-world object prejudicial to said at least one constraint, so that said at least one constraint is met.

7. The device according to claim 6, wherein said at least one processor is configured to carry out said transformation by at least one of removing, reducing, and moving said at least one real-world object in said virtually adapted 3D scene.

8. The device according to claim 1, wherein said at least one constraint concerns at least one real-world object and said at least one processor is configured to carry out said transformation by at least one of moving, rotating, translating, scaling, and duplicating said at least one real-world object so that said at least one constraint on said at least one real-world object is met.

9. The device according to claim 1, wherein said transformation involving clearing up at least one area in said virtually adapted 3D scene, said at least one processor is further configured to inpaint said at least one area in said virtually adapted 3D scene.

10. The device according to claim 1, wherein said at least one processor is further configured to let a user participate expressly in carrying out said transformation.

11. The device according to claim 1, wherein said at least one input is also adapted to receive said at least one scenario and said device further comprises at least one output adapted to output at least part of a representation of said virtually adapted 3D scene for a user to visualize said at least one scenario in said virtually adapted 3D scene.

12. The device according to claim 1, wherein said device is selected from the group consisting of a video receiver, a mobile phone, a tablet, and an augmented reality head-mounted display system.

13. A method of generating at least one dynamic virtual content to be superimposed to a representation of a real 3D scene, said at least one dynamic virtual content complying with at least one scenario defined before a runtime of said at least one scenario and involving at least one real-world constraint, said method comprising:

receiving real-world information captured in said real 3D scene; and executing said at least one scenario at said runtime in presence of said at least one real-world constraint identified from said real-world information, wherein said method further comprises, when said at least one real-world constraint is not identified from said real-world information, carrying out before executing said at least one scenario a transformation of said representation of said real 3D scene to a virtually adapted 3D scene so that said virtually adapted 3D scene fulfills said at least one constraint, and instead of executing said at least one scenario in said real 3D scene, executing said at least one scenario in said virtually adapted 3D scene replacing said real 3D scene.

14. The method according to claim 13, wherein said method is executed by a device, the device comprising:

at least one input adapted to receive said real-world information captured in said real 3D scene; and at least one processor configured to execute said at least one scenario at said runtime in presence of said at least one real-world constraint identified from said real-world information, wherein said at least one processor is further configured, when said at least one real-world constraint is not identified from said real-world information, to carry out before executing said at least one scenario said transformation of said representation of said real 3D scene to said virtually adapted 3D scene so that said virtually adapted 3D scene fulfills said at least one constraint, and instead of executing said at least one scenario in said real 3D scene, to execute said at least one scenario in said virtually adapted 3D scene replacing said real 3D scene.

15. An apparatus configured to generate at least one dynamic virtual content to be superimposed to a representation of a real 3D scene, said at least one dynamic virtual content complying with at least one scenario defined before a runtime of said at least one scenario and involving at least one real-world constraint, said apparatus comprising:

a processor; and a non-transitory computer-readable medium storing instructions, the instructions operative, when executed by the processor, to cause the apparatus to:

receive real-world information captured in said real 3D scene; and execute said at least one scenario at said runtime in presence of said at least one real-world constraint identified from said real-world information, wherein the instructions are further operative, when executed by the processor and when said at least one real-world constraint is not identified from said real-world information, to cause the apparatus to carry out before executing said at least one scenario a transformation of said representation of said real 3D scene to a virtually adapted 3D scene so that said virtually adapted 3D scene fulfills said at least one constraint, and instead of executing said at least one scenario in said real 3D scene, execute said at least one scenario in said virtually adapted 3D scene replacing said real 3D scene.

* * * * *